(12) United States Patent
Morhenn et al.

(10) Patent No.: US 8,409,700 B2
(45) Date of Patent: Apr. 2, 2013

(54) CONDENSATION CROSSLINKING SILICONE FOAMS

(75) Inventors: Stephan Morhenn, Krefeld (DE); Alfred Link, Pulheim (DE)

(73) Assignee: Sonderhoff Chemicals GmbH, Cologne (DE)

( * ) Notice: Subject to any disclaimer, the term of this patent is extended or adjusted under 35 U.S.C. 154(b) by 354 days.

(21) Appl. No.: 12/865,187

(22) PCT Filed: Feb. 24, 2009

(86) PCT No.: PCT/EP2009/001297
§ 371 (c)(1), (2), (4) Date: Jul. 29, 2010

(87) PCT Pub. No.: WO2009/106289
PCT Pub. Date: Sep. 3, 2009

(65) Prior Publication Data
US 2010/0330355 A1 Dec. 30, 2010

(30) Foreign Application Priority Data
Feb. 29, 2008 (DE) .......................... 10 2008 011 986

(51) Int. Cl.
*B32B 3/26* (2006.01)
*C08J 9/02* (2006.01)
*C08L 83/04* (2006.01)

(52) U.S. Cl. .................... 428/304.4; 156/329; 264/45.1; 264/46.4; 264/46.6; 264/46.7; 428/305.5; 428/308.4; 428/319.1; 428/450; 521/110; 524/261; 524/394; 524/588

(58) Field of Classification Search ................. 156/329; 264/45.1, 46.4, 46.6, 46.7; 428/304.4, 305.5, 428/308.4, 319.1, 450; 521/110; 524/261, 524/394, 588
See application file for complete search history.

(56) References Cited

U.S. PATENT DOCUMENTS
2,833,732 A  5/1958  Weyer
4,719,243 A  1/1988  Pocknell

FOREIGN PATENT DOCUMENTS
| | | |
|---|---|---|
| DE | 1017366 B | 10/1957 |
| DE | 3636113 A1 | 4/1987 |
| DE | 3638381 A1 | 5/1987 |
| DE | 3650085 T2 | 5/1995 |
| EP | 0691365 A1 | 1/1996 |
| EP | 0915128 A1 | 5/1999 |
| JP | 6304394 A | 11/1994 |
| WO | 00/46282 | 8/2000 |

*Primary Examiner* — D. S. Nakarani
(74) *Attorney, Agent, or Firm* — Rankin, Hill & Clark LLP

(57) ABSTRACT

A process for producing silicone foam, involves a reaction mixture in which hydrogen is released in a first reaction of compounds with at least one Si—H group in the presence of a basic catalyst. The reaction mixture is crosslinked in a second reaction in the presence of a metal catalyst.

33 Claims, No Drawings

CONDENSATION CROSSLINKING SILICONE FOAMS

CROSS REFERENCE TO RELATED APPLICATIONS

This application is a United States National Stage Application of PCT/EP2009/001279, filed 24 Feb. 2009, which claims priority to German Patent Application number 10 2008 011 986.5, filed 29 Feb. 2008, all said documents being incorporated herein by reference.

BACKGROUND OF THE INVENTION

1. Field of Invention

The invention provides processes, reaction mixtures and two-component systems for producing silicone foam, in which hydrogen is released in a first reaction of compounds with at least one Si—H group in the presence of a basic catalyst, and the reaction mixture is crosslinked in a second reaction in the presence of a metal catalyst.

2. Description of Related Art

The use of silicone foams as sealants and adhesives is known in the art. Silicone foams are provided by numerous suppliers for various applications. In commercially available foams, the crosslinking is effected usually through an addition reaction. Such products are supplied, for example, by Sonderhoff, Wacker (Elastosil™ silicone rubber) or Dow Chemical. Corresponding foams are described, for example, in EP 0691365 B1 and WO 00/46282.

These foams have the disadvantage that the raw materials are comparatively expensive. Moreover, addition-crosslinking foams are troublesome owing to the catalysts used. Especially in applications which take place in the presence of sulfur (rubber), amines, heavy metals, etc., the problem of catalyst poisoning occurs. In this case, some or all of the silicone foam does not react to completion; the process is therefore not implementable in such applications.

A further disadvantage of the known addition-crosslinking foams is that they generally have to be heated for curing, for example in a drying oven. This firstly requires high energy expenditure; secondly, articles which are heat-sensitive or difficult to access and bulky often cannot be treated with a drying oven.

Attempts have therefore been made to provide silicone foams in which the crosslinking is effected by a condensation reaction. Such foams are produced, for example, by Compact Technologies. However, they have the disadvantage that acetic acid is released in the course of the reaction. These foams are therefore not very suitable, if at all, for the foaming of corrosion-sensitive articles, for example electronic or electric components, metallic substrates, mirrors or reflectors.

U.S. Pat. No. 2,833,732 discloses processes for producing foams based on siloxane resins. The foams are obtained by heating a reaction mixture.

EP 0 915 128 A1 relates to silicone foam materials which are obtained by a polycondensation reaction. Added physical blowing agents serve substantially for foaming.

Japanese patent JP 63-43934 discloses silicone foams which comprise a guanidiniumsilane or guanidiniumsiloxane, compounds with an Si—H group and diorganopolysiloxanes with terminal hydroxyl groups. In the reaction, the Si—H groups condense with the hydroxyl groups of the diorganopolysiloxane and release hydrogen, which foams the mixture. The reaction therefore leads to a coupled crosslinking and gas formation reaction. The two reactions do not proceed independently. In the form of the guanidinium compound, only a single catalyst is used, which constitutes a specialty reagent unusual in industry, for which there are barely any possible choices, and which simultaneously accelerates both reactions. The two reactions (gas formation and crosslinking) are therefore not controllable separately from one another, which, however, in comparable reactive systems, is indispensable for adjusting the reaction profile to the requirements of a given application. The control means for these processes and end products are therefore very limited.

SUMMARY OF THE INVENTION

The invention provides reaction mixtures, silicone foams and processes for use thereof, which overcome the disadvantages described above. The processes should especially be usable in a simple manner and efficiently, and enable a multitude of applications. The silicone foams should have a good adhesion to different materials, especially metals.

The problem underlying the invention is surprisingly solved by processes, reaction mixtures, two-component systems, silicone foams and uses according to the claims.

DETAILED DESCRIPTION OF THE EMBODIMENTS

The invention provides a process and a reaction mixture for producing silicone foam, by using a reaction mixture in which molecular hydrogen is released in a first reaction of compounds with at least one Si—H group in the presence of a basic catalyst, and the reaction mixture is crosslinked in a second reaction. This second reaction is catalyzed by a second catalyst, which is a metal, a metal compound or an organometallic compound ("metal catalyst").

The second reaction is effected preferably between a polysiloxane a) with at least two Si—OH groups and a compound b) with at least two Si—O—C groups.

An inventive reaction mixture preferably comprises
a) a polysiloxane with at least two Si—OH groups,
b) a compound with at least two Si—O—C groups,
c) a metal catalyst selected from the group consisting of metals, metal compounds and organometallic compounds,
d) a compound with at least one Si—H group.

The reaction mixture additionally comprises a basic catalyst, which is either a separate catalyst e) or is identical to the compound b). In this case, the compound b) has a corresponding catalytically active functional group.

In the process according to the invention, hydrogen is released, which brings about the foaming of the reaction mixture. The addition of a further blowing gas, such as pentane, is thus not required. Preferably no further blowing gas is added.

The inventive reaction mixture enables the performance of two reactions which proceed essentially independently of one another. One reaction is the gas release reaction, in which hydrogen forms and the reaction mixture is foamed. The second reaction is the crosslinking reaction, which leads to solidification of the reaction mixture. The reactions are "independent of one another" because the particular starting materials and the catalysts can essentially be selected independently of one another, and the reaction rates and reaction profiles of each of the two reactions can be established in this way according to the requirements. This is not affected by the fact that Si—OH compounds which form in the first reaction can also subsequently be crosslinked. What is crucial, instead, is that the person skilled in the art can essentially independently control the two reactions. In this respect, the system differs from the system JP63-43934, in which hydrogen forms in a single reaction in the crosslinking reaction.

The process according to the invention and the reaction mixture have the characteristic feature that hydrogen is released in a first reaction, and the reaction mixture is crosslinked in a second reaction. In a preferred embodiment, the second reaction sets in with a time delay after the first reaction. This "time delay" means that the reaction mixture is adjusted such that it is first foamed and then the crosslinking proceeds. In the context of this invention, "time delay" does not necessarily mean that the second reaction sets in only when the first reaction is complete. Instead, the two reactions merge into one another. This can mean, for example, that the second reaction is only less than 10, 20 or 40% complete when the first reaction is already 50% complete.

In the first reaction, the gas release reaction, the compounds d) which contain Si—H groups release hydrogen. Thus, the main reaction which takes place is not a crosslinking of the compounds containing Si—H groups with further constituents of the reaction mixture. This has the advantage that the reaction mixture is at first foamed without already being impaired by simultaneous crosslinking.

This first reaction is catalyzed by bases. The reaction mixture therefore comprises at least one basic component. This basic catalyst is selected such that it enables or accelerates the first reaction. In one embodiment, the basic component is a separate basic catalyst e). In another embodiment of the invention, component b) serves as a basic catalyst. The compound b) preferably then contains one or more amino groups, which may be primary, secondary or tertiary amino groups.

The first reaction can be promoted by adding a hydrogen donor f) to the reaction mixture. According to the invention, a hydrogen donor refers to a compound which, under the reaction conditions, promotes or enables the formation of molecular hydrogen with the compound d). Suitable hydrogen donors are, for example, water, mono- or polyhydric alcohols such as methanol, ethanol, propanol, butanol, glycol, glycerol or amines, especially primary or secondary amines. The hydrogen donor is preferably added in an amount of <10, <5 or <2% by weight, more preferably between 0.2 and 5% by weight. However, the addition of a hydrogen donor is not absolutely necessary. For instance, one of the components present in the reaction mixture may also assume this function (for example an amine), or small amounts of moisture from the environment are already sufficient to release an amount of hydrogen which enables foaming.

The second reaction is a crosslinking reaction, preferably a condensation reaction. The process thus differs from the known processes in which the crosslinking of silicone foams is effected essentially by an addition reaction. It is not required in accordance with the invention that the reaction mixture comprises unsaturated carbon compounds which are addition-crosslinkable. In a preferred embodiment, the reaction mixture does not comprise any unsaturated carbon compounds. However, in a particular embodiment, the invention can be performed in such a way that, in addition to the condensation reaction, an addition reaction also takes place.

In the condensation reaction, the polysiloxane a) reacts with the compound b). This covalently bonds the compounds a) and b), such that chemical condensation and crosslinking occur. The reaction products which form in the gas reaction can likewise take part in the crosslinking reaction. In doing so, however, they are preferably not depleted significantly more rapidly than the reactants of the main crosslinking reactions.

The condensation reaction is catalyzed by the metal catalyst c), which is a metal, a metal compound or an organometallic compound. Suitable catalysts are, for example, titanium, tin, zinc, more preferably dibutyltin dilaurate (DBTDL). The amount and the type of the catalyst c) are adjusted such that the crosslinking reaction is essentially complete after a desired time.

In particular embodiments of the invention, the individual components a) to e) are configured as follows: The polysiloxanes a) with at least two Si—OH groups are also referred to as silanols. In a preferred embodiment of the invention, the polysiloxane a) is a dihydroxy-functional polydialkyl- or -arylsiloxane, for example a dihydroxy-functional polydimethylsiloxane or dihydroxy-functional polydiethylsiloxane. The compound a) serves in the inventive reaction mixture as a base polymer in the crosslinking reaction.

The compounds b) react in the condensation reaction as crosslinkers. They have at least two Si—O—C structural units, such that the compound b) is, for example, a bisalkoxysilane. The term "silane" in the context of the invention refers not only to compounds which consist exclusively of silicon and hydrogen. In the context of the invention, "silane" generally represents compounds in which the silicon atom is bonded to organic radicals and at least two of the structural units described.

In a preferred embodiment, the compound b) with the at least two Si—O—C groups has the formula $RR'Si(-O-R^1)(-O-R^2)$, $RSi(-O-R^1)(-O-R^2)(-O-R^3)$ or $Si(-O-R^1)(-O-R^2)(-O-R^3)(-O-R^4)$, where $R^1$, $R^2$, $R^3$, $R^4$, R and R' are each an organic radical. In preferred embodiments of the invention, the organic $R^1$, $R^2$, $R^3$, $R^4$, R and R' radicals are selected from the group consisting of alkyl, substituted alkyl, aryl, alkaryl and araryl radicals.

It is particularly preferred when the silicon atoms are bonded to alkoxy groups, such as methoxy or ethoxy groups.

The compounds b) are preferably vinyltrimethoxysilane (VTMO) or 3-aminopropyltriethoxysilane (AMEO), which can also be used in combination. As explained above, the compound b) may be a bifunctional compound which simultaneously fulfills the function of the basic catalyst. In this case, the compound b) has a basic group, for example an amino group. Such compounds as AMEO are also referred to as aminosilanes.

In general, the compounds a) and b) should be selected such that crosslinking occurs. In a preferred embodiment of the invention, the compound d) is an Si—H-functional polysiloxane with low chain length and a high Si—H content.

The catalyst e) is preferably selected from the group consisting of amine compounds, metal hydroxides and other Lewis bases. In a preferred embodiment of the invention, the compound b) is substituted by one or more amino groups and serves as a basic catalyst. Particular preference is given to aminoalkyltrialkoxysilanes, for example aminoalkyltriethoxysilanes such as aminopropyltriethoxysilane.

In preferred embodiments of the invention, the reaction mixture comprises additives selected from the group consisting of
f) hydrogen donors,
g) plasticizers,
h) foam stabilizers,
i) fillers and
j) other additives such as desiccants, dyes, pigments or other functional additives.

In a particularly preferred embodiment, the reaction mixture comprises water. Preference is given to a proportion of up to 10% or up to 5%, especially 0.2 to 3%. The water promotes the first reaction, in which the hydrogen is released.

Suitable plasticizers are, for example, mono-hydroxy-functional or nonfunctional silicone oils or other oils such as paraffin oil, as known for silicones.

The foam stabilizers used may be known agents such as surfactants or copolymers, as usual for other foam products.

The fillers used may be known agents such as finely divided silica, aluminosilicates, magnesia silicates, carbonates such as chalk or kaolin. Nanofillers can likewise be used.

The foams may contain any desired further additives which are known in the art, for example dyes, pigments, thermal stabilizers, antioxidants or fire protection additives.

In a preferred embodiment of the invention, the inventive reaction mixture has the following proportions of the components in % by weight:
20-95% polysiloxane a),
0.5 to 20% compound b),
0.05 to 2% metal catalyst c),
0.1 to 5% compound d),
0.05 to 10% basic catalyst e),
0 to 20% hydrogen donor f),
0 to 80% fillers i) and
0 to 50% other additives j).

The invention further provides a two-component system for producing silicone foam, comprising a component A comprising
a) a polysiloxane with at least two Si—OH groups,
d) a compound with at least one Si—H group, and a component B comprising
b) a compound with at least two Si—O—C groups,
c) a metal catalyst selected from the group consisting of metals, metal compounds and organometallic compounds.

Component B preferably comprises a basic catalyst which is simultaneously the compound b) and/or an additional catalyst e).

A hydrogen donor f) can be used in component A or B. When amines are used, they are preferably present in component B.

In a preferred embodiment, the reaction is initiated by mixing a component A, comprising the polysiloxane a) and the compound d) and optionally f), with a component B, comprising the compound b) and the metal catalyst c).

The ratio of components A to B in % by weight is between 99:1 and 1:99 in preferred embodiments, more preferably between 98:2 and 75:25.

The inventive reaction mixture or two-component system can be processed by hand or in discharge and metering apparatus known in the art. This apparatus may include tubular bags, cartridges and comparable devices for manual use, or machine metering and mixing apparatus for industrial use.

The invention also provides a process for bonding or for foam filling of an article or applying a foam to such an article, especially a sealing groove of a housing or an electronic component, wherein a silicone foam is produced by a process according to the invention on the surface of the article.

The invention also provides a silicone foam obtainable by a process according to the invention, an article which has been bonded to an inventive silicone foam, or a molding consisting of the inventive silicone foam.

In general, the invention provides processes in which the inventive reaction mixtures or two-component systems are used.

In principle, the inventive silicone foams are suitable for all applications for which silicone foams known in the art are also used. They can be used, for example, for foam filling of cavities, for sealing and for bonding and adhesive bonding of components. However, it is also possible to produce moldings from the foams, such as seals.

The invention also provides for the use of the process according to the invention in the production of electronic components, of luminaires or lamps and/or for application of foam to metals. In electronic applications, it is a particular advantage that conductor tracks made from nonferrous metals do not corrode, since no aggressive cleavage products form. In the lighting industry, reflectors with vapor-deposited metal can be treated with foam without there being any tarnishing owing to corrosive cleavage products. In general, metals are not impaired by corrosion.

The properties of the inventive foams can be regulated in a simple manner by the selection of the components. They vary according to the chain length of the OH-functional polydialkylsiloxane, the type and concentration of the fillers, and the amount of the constituents which release the blowing agent. In addition, almost all ratios of the individual constituents or else of components A and B can influence the foam properties, and the gas formation reaction can be controlled substantially independently of the crosslinking reaction. For instance, it is possible to produce foams which have a hardness of 10 Shore 00 to 60 Shore A, and which are more or less porous to a high degree.

The process, reaction mixtures and foams according to the invention differ significantly from those known in the art. For instance, none of the known processes utilizes a two-stage reaction in which hydrogen is first released without significant occurrence of crosslinking, and where condensation polymerization sets in with a time delay. The known processes utilize reaction mixtures in which either solidification proceeds through polyaddition and the hydrogen is released during the solidification, or entirely different systems.

In contrast to the process described in U.S. Pat. No. 2,833,732, heating of the inventive reaction mixtures is not required. In a preferred embodiment, the reaction is performed at room temperature or below 30 or 40° C.

In JP 45-12675, the hydrogen forms in the course of crosslinking of an organohydrodienesiloxane with a diorganopolysiloxane having terminal hydroxyl groups. Crosslinking and hydrogen generation thus do not proceed in different reactions offset in time. In addition, a guanidiniumsilane or guanidiniumsiloxane compound is necessarily used. In a preferred embodiment of the present invention, no guanidiniumsilane or guanidiniumsiloxane compound is used.

The inventive silicone foams have numerous advantages over known systems. For instance, they are producible inexpensively and in a simple manner.

The crosslinking proceeds without heat treatment, and the foams obtained are of high stability.

The inventive reaction mixtures and components A and B are chemically significantly less sensitive than addition-crosslinking systems during processing, since they do not comprise the sensitive catalysts thereof. For instance, in the case of the heavy metal catalysts of the addition-crosslinking systems (usually Pt catalysts), there is the risk of catalyst poisoning by aminic substances, sulfur or particular metal compounds.

The inventive foams can also achieve excellent adhesion to different substrates, including metals.

WORKING EXAMPLES

Example 1

Component A (95.2%):

| | |
|---|---|
| 86.5% | polydimethylsiloxane with terminal silanol groups, e.g. Silopren C (500-100 000 mPa*s) |

| | |
|---|---|
| 12% | finely divided silica (Degussa R812) |
| 1.5% | Si-H-functional polysiloxane (e.g. Baysilone MH 15 oil) |
| Component B (4.8%): | |
| 40% | vinyltrimethoxysilane (e.g. Dynasylan Si 108, Degussa) |
| 55% | 3-Aminopropyltriethoxysilane (GF91, Wacker) |
| 5% | Dibutyltin dilaurate (DBTDL) |

Example 2

| | |
|---|---|
| Component A (90.9%): | |
| 75% | OH polymer (500-100 000 mPa*s) |
| 22.5% | finely divided silica (HDK 2000, Wacker) |
| 1% | foam stabilizer (technical-grade glycerol) |
| 1.5% | Si-H-functional polysiloxane (e.g. Baysilone MH 15 oil) |
| Component B (9.1%): | |
| 20% | Vinyltrimethoxysilane (VTMO) |
| 30% | 3-Aminopropyltriethoxysilane (GF91, Wacker) |
| 5% | Dibutyltin dilaurate (DBTDL) |
| 45% | plasticizer (paraffin oil/Baysilone S oil) |

Example 3

| | |
|---|---|
| Component A (95.2%): | |
| 86.5% | OH polymer (500-100 000 mPa*s) |
| 12% | finely divided silica (Degussa R812) |
| 1.5% | Si-H-functional polysiloxane (e.g. Baysilone MH 15 oil) |
| Component B (4.8%): | |
| 72% | Oxime silane |
| 3% | Water |
| 5% | Dibutyltin dilaurate (DBTDL) |
| 20% | Ammonium bicarbonate |

Example 4

| | |
|---|---|
| Component A (95.2%): | |
| 86.5% | OH polymer (500-100 000 mPa*s) |
| 12% | finely divided silica (R812, Degussa) |
| 1.5% | Si-H-functional polysiloxane (e.g. Baysilone MH 15 oil) |
| Component B (4.8%): | |
| 40% | Vinyltrimethoxysilane (Si108, Degussa) |
| 55% | 3-Aminopropyltriethoxysilane (Dynasylan ® AMEO, Degussa) |
| 5% | Dibutyltin laurate (DBTDL) |

Example 5

| | |
|---|---|
| Component A (95.2%): | |
| 86.5% | OH polymer (500-100 000 mPa*s) |
| 12% | finely divided silica (Degussa R812) |
| 1.5% | Si-H-functional polysiloxane (e.g. Baysilone MH 15 oil) |
| Component B (4.8%): | |
| 40% | Phenyltrimethoxysilane (Dynasylan 9165) |
| 5% | Dibutyltin dilaurate (DBTDL) |
| 55% | 3-Aminopropyltriethoxysilane (Dynasylan ® AMEO, Degussa) |

Further, while considerable emphasis has been placed on the preferred embodiments of the invention illustrated and described herein, it will be appreciated that other embodiments, and equivalences thereof, can be made ad that many changes can be made in the preferred embodiment without departing from the principles of the invention. Furthermore, the embodiments described above can be combined to form yet other embodiments of the invention of this application. Accordingly, it to be distinctly understood that the foregoing descriptive matter is to be interpreted as merely as illustrative of the invention and not as a limitation.

The invention claimed is:

1. A process for producing silicone foam, by using a reaction mixture in which hydrogen is released in a first reaction of compounds with at least one Si—H group in the presence of a basic catalyst, and the reaction mixture is crosslinked in a second reaction in the presence of a metal catalyst.

2. The process of claim 1, wherein the second reaction is a condensation reaction.

3. The process of claim 1, wherein the first reaction and the second reaction proceed essentially independently of one another.

4. The process of claim, 1 wherein the second reaction proceeds with a time delay after the first reaction.

5. The process of claim, 1 wherein the second reaction is effected between a polysiloxane a) with at least two Si—OH groups and a compound b) with at least two Si—O—C groups.

6. A process for bonding or for foam filling of an article with a silicone foam or applying such a foam to such an article, wherein a silicone foam is produced by the process of claim 1 on the surface of the article.

7. An article made by processing the silicone foam produced in claim 1, wherein the article is selected from the group consisting of an electric component, a luminaire, and a lamp.

8. The process of claim 1, further comprising applying the produced silicone foam to a metal.

9. A reaction mixture for preparing silicone foam, comprising
   a) a polysiloxane with at least two Si—OH groups,
   b) a compound with at least two Si—O—C groups,
   c) a metal catalyst selected from the group consisting of metals, metal compounds and organometallic compounds,
   d) a compound with at least one Si—H group,
   e) a basic catalyst either identical to the compounds b) or a separate catalyst.

10. The reaction mixture of claim 9, wherein the reaction mixture releases hydrogen which brings about the foaming of the reaction mixture.

11. The reaction mixture as claimed in claim 9, wherein polysiloxane a) is a polydialkylsiloxane.

12. The reaction mixture of claim 9, wherein compound b) has the formula RR'Si(—O—R$^1$)(—O—R$^2$), RSi(—O—R$^1$)(—O—R$^2$)(—O—R$^3$) or Si(—O—R$^1$)(—O—R$^2$)(—O—R$^3$)(—O—R$^4$), where R$^1$, R$^2$, R$^3$, R$^4$, R and R' are each an organic radical.

13. The reaction mixture of claim 12, wherein the organic R$^1$, R$^2$, R$^3$, R$^4$, R and R' radicals in compound b) are selected from the group consisting of alkyl, substituted alkyl, aryl, alkaryl and araryl radicals.

14. The reaction of claim 9, wherein the metal catalyst c) is an organotin compound.

15. The reaction mixture of claim 14, wherein the organotin compound is dibutyltin dilaurate (DBTDL), tin octoate or dimethyltin dicarboxylate.

16. The reaction mixture of claim 9, wherein compound d) is an Si—H-functional polysiloxane.

17. The reaction mixture of claim 9, wherein the basic catalyst e) is a base selected from the group consisting of amino compounds, metal hydroxides, metal salts and other Lewis bases.

18. The reaction mixture of claim 9, wherein the reaction mixture further comprises at least one additive selected from the group consisting of:
   f) hydrogen donors,
   g) plasticizers,
   h) foam stabilizers,
   i) fillers, and
   j) other additives such as desiccants, dyes, pigments, blowing agents and other functional additives.

19. The reaction mixture of claim 9, wherein the proportions of the components in % by weight are:
   20-95% polysiloxane a),
   0.5 to 20% compound b),
   0.05 to 2% metal catalyst c),
   0.1 to 5% compound d),
   0.05 to 10% catalyst e),
   0 to 80% fillers and
   0 to 50% other additives.

20. The reaction mixture of claim 9 in the form of a two-component system.

21. A process for producing silicone foam comprising reacting the components of claim 9.

22. The process of claim 21, wherein the reaction is initiated by mixing component A, comprising the polysiloxane a) and the compounds d), with component B, comprising the compound b) and the metal catalyst c).

23. An article bonded to the silicone foam obtained by the process of claim 22.

24. The article of claim 23, wherein the article is a housing groove or an electronic component.

25. A process for bonding or for foam filling of an article with a silicone foam or applying such a foam to such an article, wherein a silicone foam is produced by the process of claim 21 on the surface of the article.

26. An article made by processing the silicone foam produced in claim 21, wherein the article is selected from the group consisting of an electric component, a luminaire, and a lamp.

27. The process of claim 21, further comprising applying the produced silicone foam to a metal.

28. An article made by reacting the reaction mixture of claim 9, wherein the article is selected from the group consisting of an electric component, a luminaire, and a lamp.

29. A process of reacting the reaction mixture of claim 9 to produce a foam, the process further comprising applying the foam to a metal.

30. A two-component system for producing silicone foam, comprising a component A, wherein component A comprises:
   a) a polysiloxane with at least two Si—OH groups,
   d) a compound with at least one Si—H group,
   and a component B comprising
   b) a compound with at least two Si—O—C groups,
   c) a metal catalyst selected from the group consisting of metals and organometallic compounds.

31. The two-component system of claim 30, wherein component B further comprises a basic catalyst e) which is an additional compound or which is identical to the compound b).

32. A process for producing silicone foam comprising reacting the components of claim 30.

33. A process of reacting the two-component system of claim 30 to produce a foam, the process further comprising applying the foam to a metal.

* * * * *